United States Patent
Vandersluis et al.

(10) Patent No.: US 6,447,041 B1
(45) Date of Patent: Sep. 10, 2002

(54) INTEGRATED HVAC AND STEERING COLUMN SUPPORT STRUCTURE

(75) Inventors: Daniel Roger Vandersluis, Plymouth; Gary William Ismet, Brighton; Kenneth Kwangho Ahn, Trenton, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/655,615

(22) Filed: Sep. 6, 2000

(51) Int. Cl.[7] .............................................. B62D 25/14
(52) U.S. Cl. ........................... 296/72; 296/70; 296/208; 296/194
(58) Field of Search ...................... 296/72, 192, 208, 296/70, 194, 203.02; 280/779

(56) References Cited

U.S. PATENT DOCUMENTS

| | | | |
|---|---|---|---|
| 4,679,730 A | | 7/1987 | Goroh |
| 5,005,898 A | * | 4/1991 | Benedetto et al. .......... 296/194 |
| 5,088,571 A | * | 2/1992 | Burry et al. .................... 296/70 |
| 5,234,246 A | * | 8/1993 | Henigue et al. ............... 296/70 |
| 5,273,310 A | * | 12/1993 | Terai ............................. 296/70 |
| 5,311,960 A | * | 5/1994 | Kukainis et al. .............. 296/70 |
| 5,387,023 A | * | 2/1995 | Deneau ......................... 296/72 |
| 5,556,153 A | * | 9/1996 | Kelman et al. ................ 296/70 |
| 5,564,515 A | * | 10/1996 | Schambre ..................... 296/70 |
| 5,564,769 A | * | 10/1996 | Deneau et al. ................ 296/72 |
| 5,673,964 A | * | 10/1997 | Roam et al. ................. 296/194 |
| 5,676,216 A | * | 10/1997 | Palma et al. ................... 296/70 |
| 5,707,100 A | * | 1/1998 | Suyama et al. ................ 296/70 |
| 5,709,601 A | | 1/1998 | Heck |
| 5,762,395 A | * | 6/1998 | Merrifield et al. ........... 296/208 |
| 5,857,726 A | * | 1/1999 | Yokoyama et al. ........... 296/70 |
| 5,934,744 A | * | 8/1999 | Jergens et al. ................. 296/70 |
| 5,938,266 A | * | 8/1999 | Dauvergne et al. ........... 296/70 |
| 5,979,965 A | * | 11/1999 | Nishijima et al. ............. 296/70 |
| 5,997,078 A | * | 12/1999 | Beck et al. .................... 296/70 |
| 6,045,444 A | | 4/2000 | Zima et al. |
| 6,073,987 A | * | 6/2000 | Lindberg et al. .............. 296/70 |
| 6,110,037 A | * | 8/2000 | Yoshinaka .................... 296/70 |
| 6,129,406 A | * | 10/2000 | Dauvergne .................... 296/70 |
| 6,186,885 B1 | * | 2/2001 | Ahn et al. .................... 454/121 |
| 6,186,887 B1 | * | 2/2001 | Dauvergne .................. 296/208 |
| 6,213,504 B1 | * | 4/2001 | Isano et al. .................... 296/70 |
| 6,234,569 B1 | * | 5/2001 | Derleth et al. ................. 296/70 |
| 6,276,739 B1 | * | 8/2001 | Wich ............................. 296/72 |

* cited by examiner

Primary Examiner—Ken Patel

(57) ABSTRACT

An integrated heating ventilation and air conditioning unit ("HVAC") and steering column support structure 10. Structure 10 is adapted to be operatively installed within a conventional automotive vehicle of the type including a conventional body assembly having an underbody platform or structure 12 and a steering assembly 14. Assembly 10 includes elongated lateral support structures or members 20, 22; an integrated "HVAC" duct/face plate/support structure or member 24; an "HVAC" housing or assembly 26; and support brackets 30, 32, and 34. Members 20, 22, and 24 and brackets 30–34 cooperate to support steering wheel assembly 18. Member 24 acts as both a support for the "HVAC" assembly 26 and a support for steering assembly 14.

16 Claims, 3 Drawing Sheets

INTEGRATED HVAC AND STEERING COLUMN SUPPORT STRUCTURE

FIELD OF INVENTION

The present invention relates to a heating ventilation and air conditioning unit ("HVAC") and steering column support structure and more particularly, to an integrated HVAC and steering column support structure which combines the vehicle's cockpit structural assemblies and attributes with the vehicle's HVAC, thereby reducing the cost and weight of the vehicle, increasing packaging efficiency, and improving system quality and safety.

BACKGROUND OF THE INVENTION

Vehicle passenger compartments or cockpits typically include various devices such as a steering wheel assembly, an instrument panel, electrical and mechanical subsystems, pedal assemblies, a heating ventilation and air conditioning unit ("HVAC") and ducts, and several support structures and assemblies which are used to mount and hold these components. These structural supports and assemblies typically include one or more stanchions, cross car beams, and tunnel mounted brackets which are rigidly attached to the vehicle body and which cooperatively support the steering column, HVAC, instrument panel, dashboard and other components. While these structural assemblies effectively support the vehicular cockpit components and provide a desirable level of stiffness and rigidity, they suffer from some drawbacks.

For example and without limitation, these added support members or systems undesirably lengthen and complicate the manufacturing process, decrease packaging efficiency and increase the weight of the vehicle. Particularly, these supports typically do not integrate the other necessary passenger compartment assemblies, such as the HVAC system, the instrument panel, dashboard, and other electrical and mechanical subsystems and thus, they add to the weight and complexity of the vehicle's cockpit, thereby complicating and lengthening the overall vehicle assembly procedure.

Some attempts have been made to integrate certain functional components of the vehicle's cockpit and/or instrument panel into structural supports to save space within the vehicle. Particularly, attempts have been made to integrate cross car air ducts into certain parts of the instrument panel support structure. However, such attempts have not provided the necessary steering column support and therefore have not eliminated much of the required support system such as the tunnel mounted bracket assembly. Moreover, the integration of cross-vehicle air ducts into structural members (or the integration of structural members into air ducts) severely limits the design flexibility of the cross-vehicle air ducts, thereby significantly increasing the manufacturing cost of the ducts and/or making the ducts unable to be integrated into certain vehicle cockpits.

Therefore, a need exists for an integrated HVAC and steering column support assembly which integrates the structural attributes of the instrument panel support assembly into the HVAC system, thereby desirably reducing the weight, cost and packaging space of the vehicle.

SUMMARY OF THE INVENTION

It is a first object of the present invention to provide an integrated HVAC and steering column support structure which overcomes the various and previously delineated drawbacks of prior vehicle support assemblies and systems.

It is a second object of the present invention to provide an integrated HVAC and steering column support structure which efficiently combines the steering column support function and the HVAC function into a single synergistic system.

It is a third object of the present invention to provide an integrated HVAC and steering column support structure which eliminates the need for a tunnel mounted bracket assembly.

It is a fourth object of the present invention to provide an integrated HVAC and steering column support structure which lowers vehicle cost and weight, and which improves packaging efficiency and crash intrusion characteristics.

According to a first aspect of the present invention, an integrated HVAC assembly and steering column support structure is provided for use within a vehicle. The structure includes a first portion which is coupled to said steering column and to a body assembly of the vehicle; and a second portion which forms a portion of the HVAC assembly and which is coupled to an underbody assembly of the vehicle, wherein the first and second portions are effective to cooperatively support the HVAC assembly and the steering column.

According to a second aspect of the present invention, a method for integrally supporting a HVAC assembly and a steering wheel assembly is provided. The method includes the steps of providing an integrated HVAC face plate support member; providing a steering assembly support member; attaching the integrated HVAC face plate support member to an underbody portion of the vehicle; attaching the HVAC assembly to the HVAC face plate support member, thereby supporting the HVAC assembly; attaching the steering wheel support member to a body portion of the vehicle and to the HVAC face plate support member; and coupling the steering wheel assembly to the steering wheel support member, thereby supporting the steering wheel assembly.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
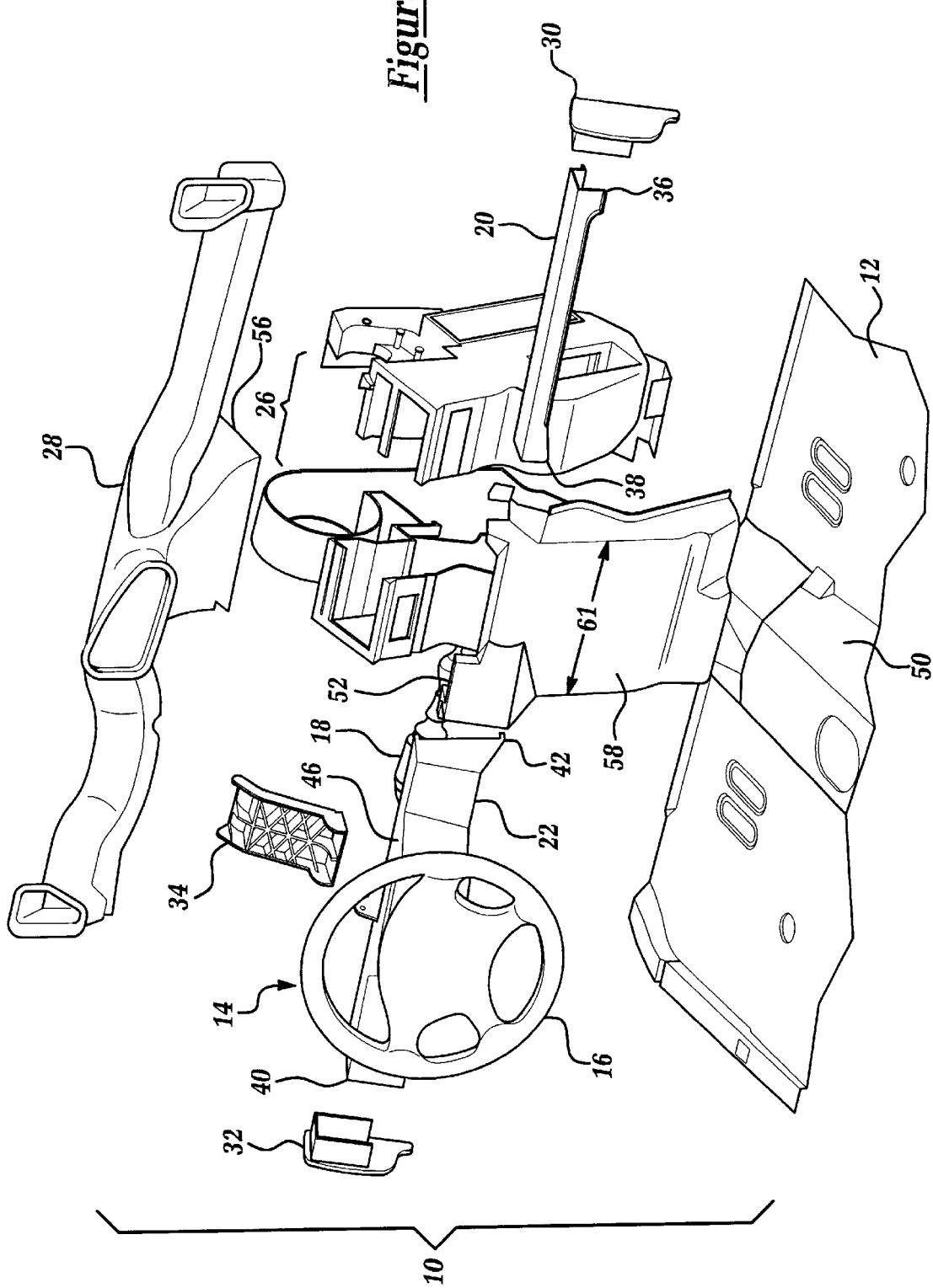
FIG. 1 illustrates an exploded view of an integrated HVAC and steering column support structure which is made in accordance with the teachings of the preferred embodiment of the present invention.
Figure 2:
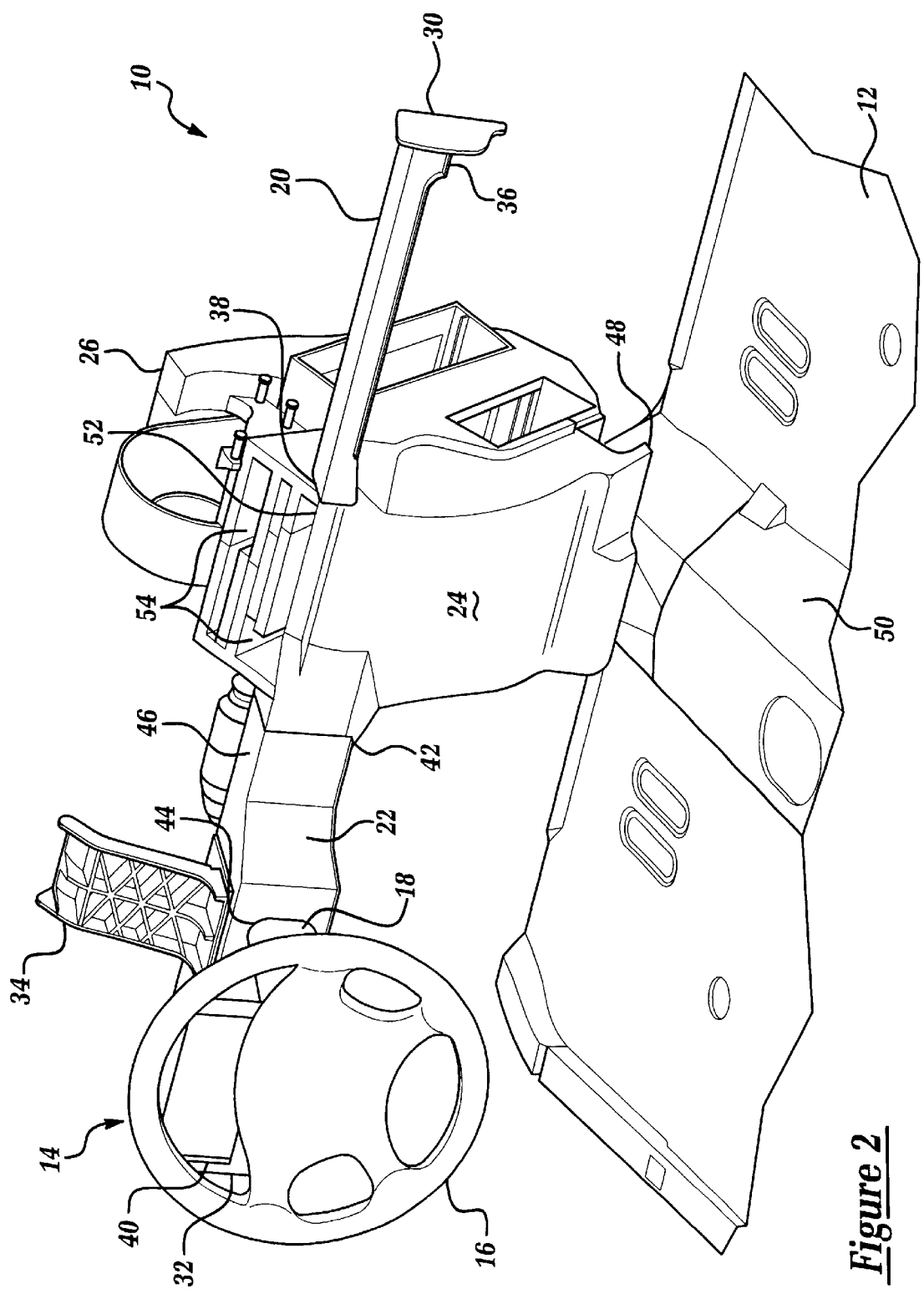
FIG. 2 illustrates an assembled view of the integrated HVAC and steering column support structure shown in FIG. 1.

Referring now to FIGS. 1–2, there is shown an integrated heating ventilation and air conditioning unit ("HVAC") and steering column support structure, apparatus or assembly 10 which is made in accordance with the teachings of the preferred embodiment of the invention. Assembly 10 is adapted to be operatively installed within a conventional automotive vehicle of the type including a conventional body or body assembly having an underbody platform or structure 12 and a steering assembly 14 including a steering wheel 16 and a steering column 18.

Assembly 10 includes elongated lateral support structures or members 20, 22; an integrated HVAC duct/face plate/support structure or member 24; HVAC housing or components 26; an HVAC duct member 28; and support brackets 30, 32, and 34. Support structures 20, 22 and 24 are each manufactured from a strong, rigid and durable material such as a conventional metal or composite material. In the preferred embodiment, the material (e.g. metal/composite) used to manufacture structures 20–24 is overmolded with plastic through a conventional overmolding process. The overmolding of the structural members 20–24 allows for the relatively simple attachment and housing of various electrical and mechanical subsystems, thereby providing improved cost, weight and packaging efficiency. For example and without limitation, the overmolding on the interior surfaces of these structural members can be molded and/or shaped to include various housing and attachment type features which allow vehicle components and accessories to be relatively easily attached or housed within the structural members.

Support member 20 is an elongated and generally rectangular passenger side cross beam having a generally "C"-shaped cross section and an "outer" end 36 and an "inner" end 38. Member 20 is fixedly attached to the passenger side of the vehicle body at outer end 36 by use of bracket 30, which is attached to end 36 and to the vehicle body in a conventional manner (e.g., welded). Member 20 is fixedly attached to HVAC face plate and support structure 24 at inner end 38 in a conventional manner such as by use of an interlocking overmolded joint and/or by use of conventional fasteners or welds.

Support member 22 is an elongated and generally rectangular driver side or steering column support cross beam having a "C"-shaped cross section, an "outer" end 40, an "inner" end 42, and a steering wheel reception aperture 44. Member 22 is fixedly attached to the driver side of the vehicle body at outer end 40 by use of bracket 32, which is attached to end 40 and to the vehicle body in a conventional manner (e.g., welded or fastened). Member 22 is further attached to the vehicle body by use of bracket 34 which is attached to the top surface 46 of member 22 and which provides substantially vertical support to member 22 and steering wheel assembly 14. Steering column 18 extends through aperture 44, thereby allowing member 22 to support steering column 18 and steering wheel 14. Member 22 is fixedly attached to HVAC face plate and support structure 24 at inner end 42 in a conventional manner such as by use of an interlocking overmolded joint and/or by use of conventional fasteners or welds.

Member 24 is an integrated HVAC face plate and support structure, which is fixedly attached to the underbody 12 of the vehicle at a first or "bottom" end 48 in a conventional manner (e.g., welded or fastened), and more particularly, is attached to the tunnel portion 50 of the vehicle underbody 12. Member 24 has a substantially flat outer surface 58 and has a width 61 which is substantially similar to the width of tunnel portion 50, thereby providing a relatively secure and rigid connection to tunnel portion 50. Member 24 extends substantially vertically from underbody 12 to a second or "upper" end 52 which cooperates with HVAC components or assembly 26 to form air communication apertures 54 and to assist in channeling air from assembly 26 through apertures 54 (e.g., member 24 forms a portion of an HVAC air channeling duct). Member 24 is coupled to HVAC components 26 in a conventional manner, and operatively supports assembly 26. End 56 of duct member 28 selectively attaches to the upper end 52 and to components 26, thereby allowing duct member 28 to communicate with apertures 54 and to receive and/or communicate airflow from/to HVAC components 26 and to transfer airflow to various regions of the passenger compartment. In this manner, member 24 forms an integral portion of the vehicle's HVAC unit or assembly, while concomitantly supporting the HVAC components 26. In the preferred embodiment of the invention, members 20, 22, 24 and 34 are "tuneable" for stiffness by altering or augmenting the composite material ratio (e.g., the amount of metal versus overmolded material) to meet differing vehicle structural requirements. In one alternate embodiment, members 20, 22 and 24 comprise a one-piece integral molded structure.

Figure 3:
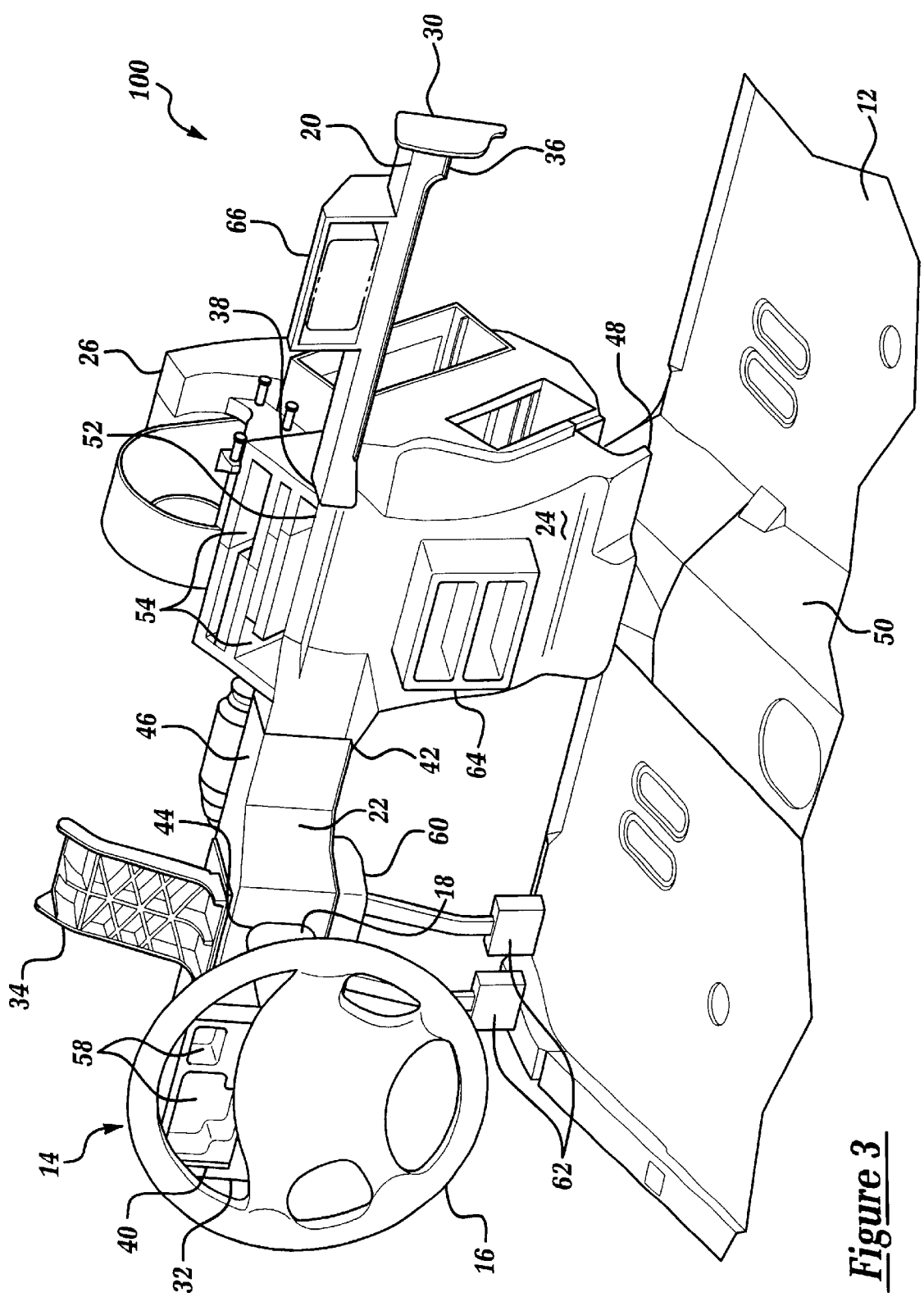
FIG. 3 illustrates an assembled view of an integrated HVAC and steering column support structure which is made in accordance with the teachings of a second embodiment of the present invention.

In one alternate embodiment, which is shown in FIG. 3, members 20, 22 and 24 include additional integrally formed housings and/or dash panel modules. Particularly, in support structure 100 of FIG. 3, member 22 includes integrally formed electronics housings 58 and a pedal support structure 60 for operatively supporting the vehicle's pedals 62; member 24 includes integrally formed radio and/or climate control housing 64; and member 20 includes integrally formed air bag housing 66.

In operation, members 20, 22 and 24 and brackets 30–34 cooperate to support steering wheel assembly 18. Particularly, members 20–24 provide support from both sides of the vehicle body (i.e., through members 20 and 22) and from the floor or underbody 12 of the vehicle (i.e., through member 24). Member 24 acts as both a support for HVAC components 26 and a support for steering assembly 14. Importantly, member 24 provides vertical support at the center (e.g., tunnel portion) of the vehicle underbody 12,. thereby improving the overall center stiffness of the assembly. The integrated HVAC and structural assembly 10 may be installed onto vehicle in a relatively quick and simple manner, and offers a significant advantage over prior art HVAC and support assemblies.

Particularly, assembly 10 efficiently combines the steering column support function and the HVAC function into a single synergistic system. The use of the integrated HVAC face plate and structural member 24 obviates the need for a tunnel mounting bracket assembly, thereby lowering the overall weight of the vehicle and improving packaging efficiency. The reduced the number of components required for the vehicle cockpit simplifies assembly and shortens the overall build time required for the vehicle. Moreover, the rigid attachment of the HVAC components 26 to the structural face plate member 24 improves crash intrusion performance and is "tuneable" for stiffness. Particularly, the structural face plate 24 acts as a shield to prevent and/or substantially reduce the intrusion of components 26 into the vehicle passenger compartment during a frontal collision.

It should be understood that this invention is not to be limited to the exact construction or embodiment described above but that various changes may be made without departing from the spirit or scope of the invention.

What is claimed is:

1. An integrated HVAC assembly and steering column support structure for use within a vehicle comprising a first portion which receives a steering column and is coupled to a body assembly of said vehicle; a second portion which comprises a face plate structure having a substantially flat inner surface that forms a portion of a HVAC assembly and which is coupled to an underbody assembly of said vehicle; and an angled support bracket which is disposed above said steering column and which is coupled to said first portion and to said vehicle, wherein said first and second portions and said angled support bracket are effective to cooperatively support said HVAC assembly and said steering column and wherein said inner surface of said face plate structure cooperates with said HVAC assembly to distribute air throughout said vehicle.

2. The integrated HVAC assembly and steering column support structure of claim 1 wherein said first and second portions are integrally formed by use of an overmolding process.

3. The integrated HVAC assembly and steering column support structure of claim 1 wherein said second portion is coupled to a tunnel portion of said underbody assembly.

4. The integrated HVAC assembly and steering column support structure of claim 3 wherein said first portion includes an aperture which selectively receives said steering column.

5. The integrated HVAC assembly and steering column support structure of claim 4 wherein said first portion further comprises an integrally formed pedal support structure.

6. The integrated HVAC assembly and steering column support structure of claim 5 wherein said first portion further comprises an integrally formed dash panel module.

7. A method for integrally supporting a HVAC assembly and a steering wheel assembly within a vehicle, said method comprising the steps of:

providing an integrated HVAC face plate support member having a substantially flat outer surface which forms a portion of said HVAC assembly;

providing a steering assembly support member;

attaching said integrated HVAC face plate support member to an underbody portion of said vehicle;

attaching said HVAC assembly to said HVAC face plate support member, thereby supporting said HVAC assembly;

attaching said steering wheel support member to a driver side body portion of said vehicle and to said HVAC face plate support member; and coupling said steering wheel assembly to said steering wheel support member, thereby supporting said steering wheel assembly.

8. The method of claim 7 wherein said HVAC face plate support member is attached to a tunnel portion of said underbody.

9. The method of claim 8 wherein said HVAC face plate support member further comprises integrally an formed housing for retaining electrical components of said vehicle.

10. The method of claim 9 wherein said steering wheel support member further comprises an integrally formed pedal support structure.

11. The method of claim 10 wherein said HVAC face plate support member and said HVAC assembly cooperatively form an air communication aperture, said method further comprising the steps of:

providing an air duct member;

coupling said air duct member to said air communication aperture, thereby communicating airflow within said vehicle.

12. A vehicular ventilation and air conditioning assembly comprising a generally hollow duct member having a first plurality of apertures; an assembly having a first portion including a second aperture which directs air along an upward direction and which communicates with said first plurality of apertures, wherein said first portion further includes a third and a fourth aperture, said third and fourth apertures being substantially parallel, residing below said second aperture, and directing air along a respective second and third directions which are perpendicular to said upward direction, said assembly further having a second portion and a third portion which extend in opposite directions from said first portion, which are parallel to said third and fourth apertures, and which provide lateral support to said first portion, and wherein said second portion includes a steering column reception aperture to receive a vehicle steering column; a pair of substantially identical support brackets which are respectively coupled to a unique one of said second and third portions; and a third angled bracket having a flat portion which is coupled to said first portion substantially above said steering column reception aperture and an angled portion which is coupled to said vehicle, wherein said third angled bracket provides vertical support to said first portion and to said steering column.

13. The vehicular ventilation and air conditioning assembly of claim 12 wherein said third and fourth apertures are below said steering wheel reception aperture.

14. The vehicular ventilation and air-conditioning assembly of claim 13 wherein said third and fourth apertures are generally rectangular.

15. The vehicular ventilation and air-conditioning assembly of claim 13 wherein second portion is attached to said first portion by use of an interlocking overmolded joint.

16. The vehicular ventilation and air-conditioning assembly of claim 13 wherein said first, second, and third portions comprises a one piece integral molded structure.

* * * * *